March 17, 1970 C. W. GUTHRIE, SR. 3,501,316
METHOD OF FRYING CHICKEN
Filed July 27, 1967 4 Sheets-Sheet 1

INVENTOR
CLIFTON W. GUTHRIE, SR.

BY
HIS ATTORNEYS

March 17, 1970  C. W. GUTHRIE, SR.  3,501,316
METHOD OF FRYING CHICKEN
Filed July 27, 1967  4 Sheets-Sheet 2

INVENTOR
CLIFTON W. GUTHRIE, SR.
BY
HIS ATTORNEYS

March 17, 1970 C. W. GUTHRIE, SR. 3,501,316
METHOD OF FRYING CHICKEN
Filed July 27, 1967 4 Sheets-Sheet 3
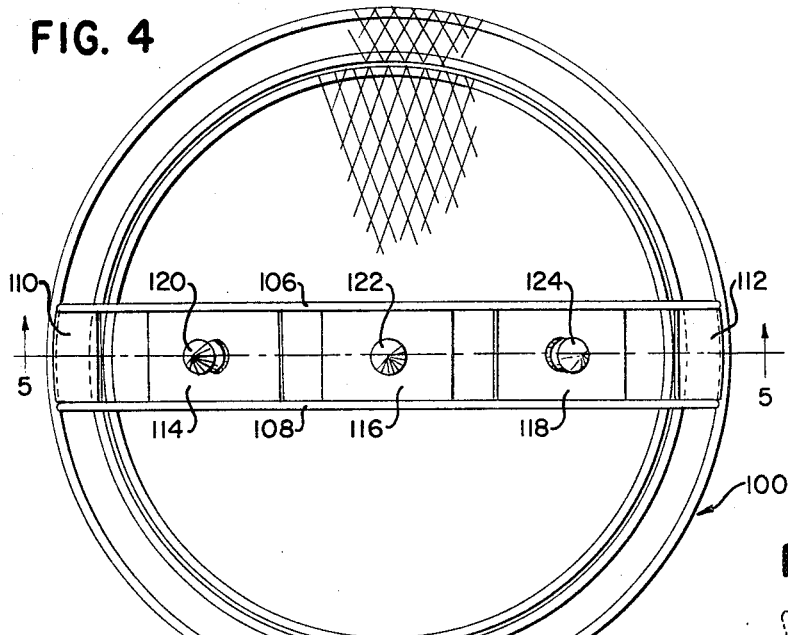
FIG. 4
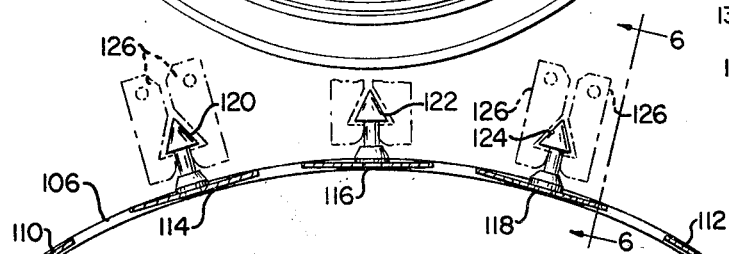
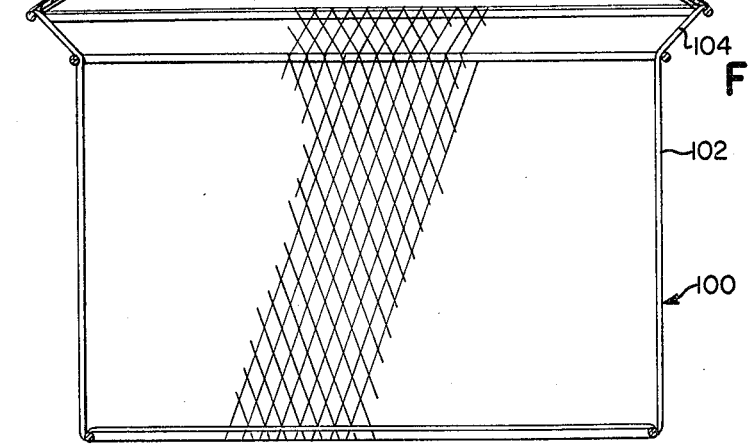
FIG. 6
FIG. 5
INVENTOR
CLIFTON W. GUTHRIE, SR.
BY
HIS ATTORNEYS March 17, 1970    C. W. GUTHRIE, SR.    3,501,316
METHOD OF FRYING CHICKEN
Filed July 27, 1967    4 Sheets-Sheet 4
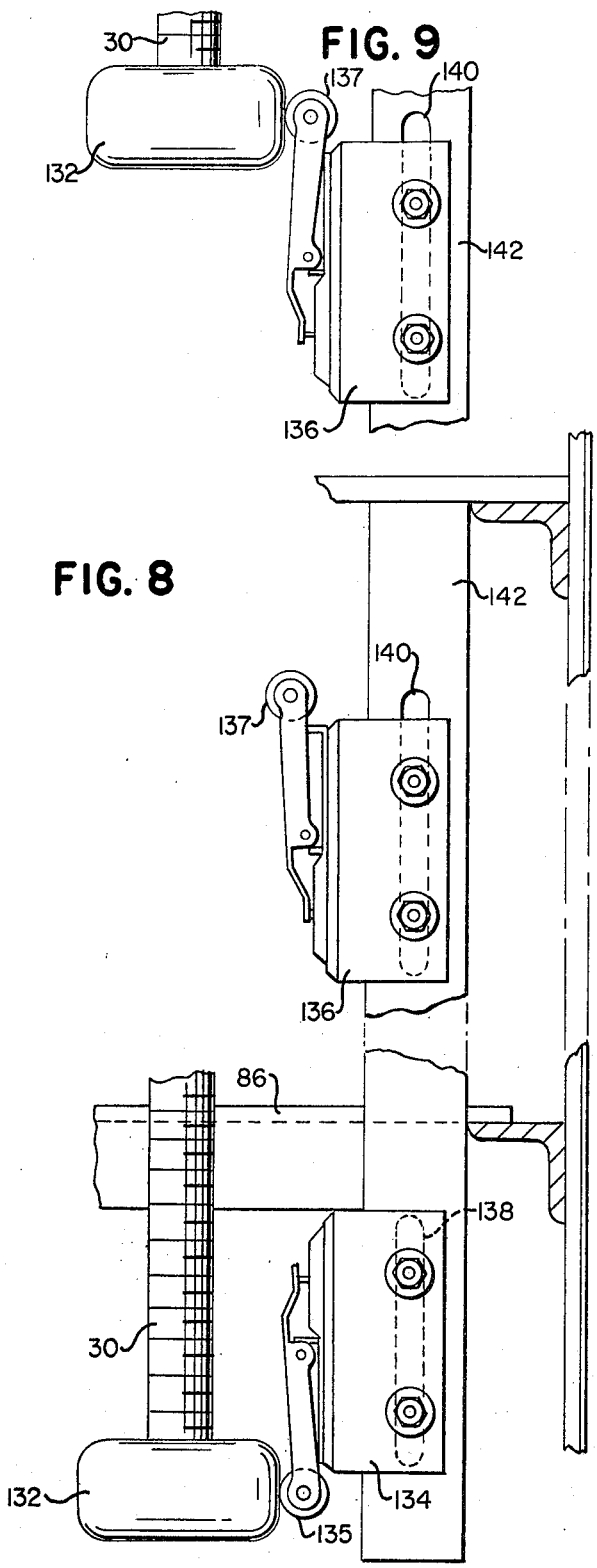
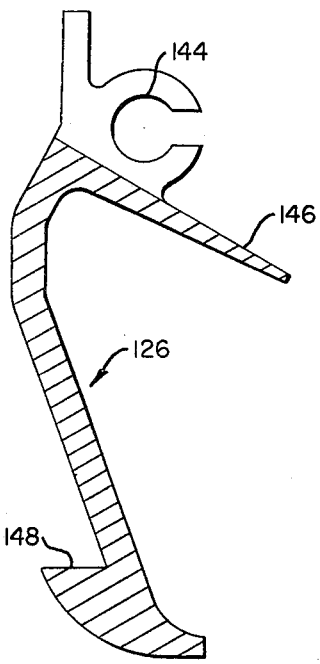
INVENTOR
CLIFTON W. GUTHRIE, SR.
HIS ATTORNEYS

United States Patent Office 3,501,316
Patented Mar. 17, 1970

3,501,316
METHOD OF FRYING CHICKEN
Clifton W. Guthrie, Sr., Richmond, Va., assignor to Golden Skillet Corporation, Richmond, Va., a corporation of Virginia
Filed July 27, 1967, Ser. No. 656,500
Int. Cl. A22c *21/00;* A47j *37/12*
U.S. Cl. 99—107                         5 Claims

ABSTRACT OF THE DISCLOSURE

A method of and apparatus for frying chicken so as to produce the equivalent of a covered pan fried product. Chicken parts are marinated and breaded prior to cooking in a preheated apparatus. Following immersion in a cooking oil, the chicken parts are stirred, hermetically sealed and then cooked automatically according to a preselected cooking cycle. Pressure relief means insures that the pressure within a sealed cooking container is maintained within one pound per square inch of atmospheric pressure. Motor driven screw means automatically lifts the chicken parts from the cooking apparatus at the conclusion of the cooking cycle.

---

This invention relates to a method of and apparatus for frying chicken suitable for use in commercial installations such as may be practiced in franchised installations.

Heretofore it has been customary in commercial installations to fry chicken under pressure and thereby obtain a more rapid frying of the chicken so as to be able to meet customer demands for relatively rapid service. Certain undesirable risks are inherent in such a pressure frying in addition to the prospect of producing some undesirable products. For example, there is a danger of explosion when the chicken is fried under pressure at cooking temperatures varying from 250° F. to 400° F. Also it has been known that under pressure the product puffs up and bursts. This is especially noticeable in chicken legs which then shrivel up and pull away from the bone.

Accordingly, it is an important feature of the present invention to eliminate all danger of explosion by virtually eliminating all pressure in the frying or cooking operation while still retaining moisture in the product. It has been found that chicken parts fried in accordance with the present invention hold up longer, retain their shape considerably better than heretofore, and are pleasing in appearance and taste.

In the practice of the method of the present invention, the chicken is cut into desired parts, such as breasts, legs, thighs, wings and neck and marinated to impart flavor prior to being breaded and fried. The novel apparatus of the present invention receives the marinated and breaded chicken and cooks it automatically according to a preselected cooking cycle.

Specifically, the product is loaded into a wire basket conveniently located initially on a stand of the apparatus. The wire basket is then manually dropped into a container such as a kettle within the apparatus so as to immerse the chicken parts in preheated cooking oil therein. The chicken parts are stirred so as to break them apart and thereby avoid white spots on the finished product caused by uncooked breading in the stuck together areas.

A top cover for the container or kettle is then automatically lowered by motor driven screw means so that a peripherally retained gasket on the top cover hermetically seals the container. Simultaneously, spring loaded latching means on the underside of the top cover lockingly engages locking means affixed to the top of the wire basket to permit automatic withdrawal of the chicken parts within the basket at the end of a preselected cooking cycle. Pressure relief means are employed in conjunction with the kettle so as to insure that the product is virtually the equivalent of a covered pan fried product. The pressure relief means consists of a ball check valve which maintains the water vapor to a substantial extent and vents the pressure whenever it tends to build up. This closely approximates the action of a dancing iron-lead lid on a skillet. Immediately upon completion of the cooking cycle, the motor driven screw means automatically lifts the chicken parts from their immersion within the cooking oil to a position where the wire basket may be removed by an attendant from the cooking apparatus.

The important features and advantages of the present invention will become readily apparent upon reference to the detailed specification and drawings wherein:

FIG. 4 is a top plan view of the basket assembly;

FIG. 5 is a cross sectional elevational view of the basket assembly taken along line 5—5 of FIG. 4;

FIG. 6 is a fragmentary side elevational view of the latch assembly taken along line 6—6 of FIG. 5;

FIG. 7 is an enlarged cross sectional view of a latching member suitable for use with the present invention;

FIG. 8 is a fragmentary view drawn to an enlarged scale of the limit switch means shown in FIG. 2; and FIG. 9 is a fragmentary view of a portion of FIG. 8 showing a different position of the switch actuator.

Figure 1:
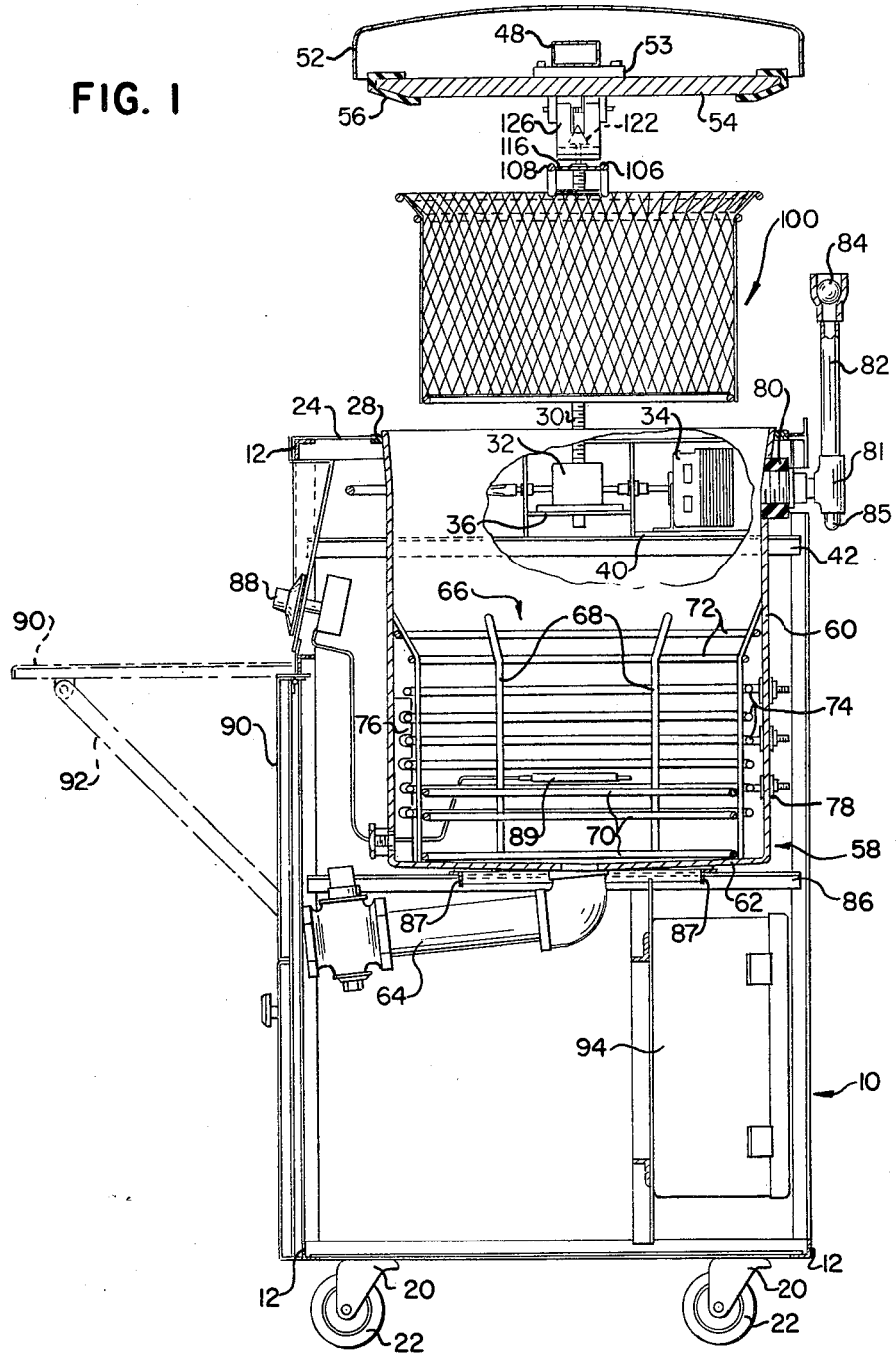
FIG. 1 is a side elevational view partially in cross section and with parts broken away.
Figure 3:
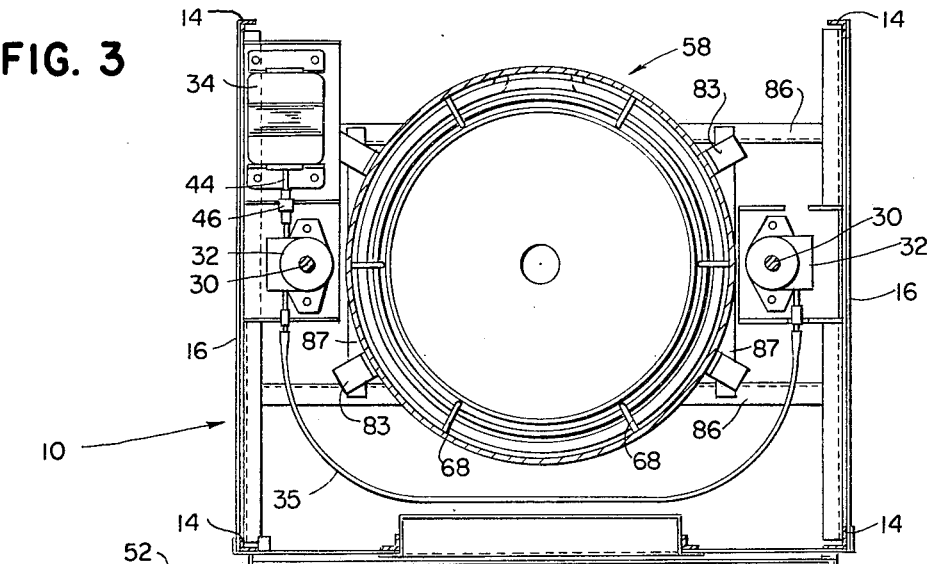
FIG. 3 is a top plan view of the apparatus shown in FIG. 1.
Figure 2:
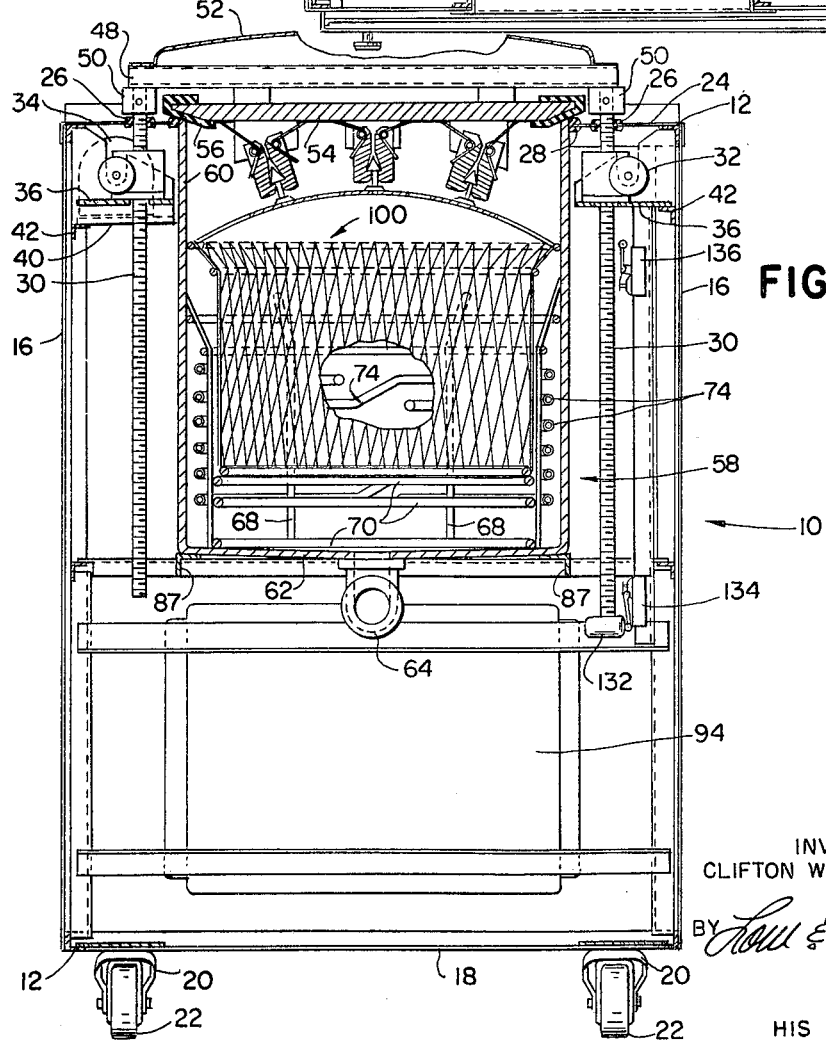
FIG. 2 is a front elevational view of the apparatus of FIG. 1 partially in cross section and with parts broken away.

Referring now to FIGS. 1, 2 and 3 of the drawings, there is illustrated a frame, indicated generally at 10, having a series of horizontally extending angle members 12 and a series of vertically extending angle members 14. Side panels are indicated at 16 and a bottom panel is shown at 18, all of which are suitably affixed to the angle members 12 and 14 which form a skeleton for the frame 10. The apparatus is made portable by use of casters 20 and caster wheels 22.

A top closure is provided by means of top panel 24 which employs grommets at 26 and 28 for certain protruding elements through the top panel 24 which will be described hereinafter.

One set of protrusions through the top panel consists of a pair of screws 30 each of which is driven by a respective jack motor 32. A main drive motor 34, shown best in FIG. 3, drives one of jack motors 32 which motion is simultaneously imparted to the other jack motor 32 by means of flexible coupling 35. The jack motors 32 are suitably mounted to the frame 10 with the aid of shelf supports 36 and the main drive motor 34 is mounted on shelf 40 with suitable angle irons 42 providing the required stability for affixation to the frame 10. The main drive motor is shown to have an output shaft 44 connected by rigid coupling 46 to one of the jack motors 32 in FIG. 3.

A jack frame 48 is provided with a pair of drilled bars 50, FIG. 2, which are mounted atop the ends of screws 30 and provide the inner connection between screws 30 and a spun cover 52 which is suitably attached to the jack frame 48 such as by welding.

Jack frame 48 is attached with the aid of flange means 53 welded thereto to a circular plate member 54. The circumferential periphery of plate member 54 is provided with a gasket 56 having a suitable hardness such as a durometer of 70 to provide a hermetic seal to an internal container indicated generally at 58 by engagement of gasket 56 with the side walls 60 of container 58.

It will be observed that container 58 which is in effect a kettle into which is placed the desired amount of cooking oil, is provided with a sloping bottom 62 which leads into a pipe and drain assembly 64. The latter is of a sufficiently large enough diameter to permit both the oil and loose breading to be carried to a suitable filter (not shown) from which the oil is re-cycled.

An open cage member, indicated generally at 66, has a plurality of vertically extending bars 68, the upper ends of which slope outwardly and upwardly so as to provide guiding means for a wire basket 100 to be described more fully hereinafter. The cage assembly 66 is further provided with a number of internal reenforcing members 70 and a number of external reenforcing members 72. Surrounding cage assembly 66 are a series of heating elements 74 which are received in a support member 76, FIG. 1, and are mounted in heat insulating relationship at 78 with respect to container 58.

In order to prevent any substantial buildup of pressure within the container 58, the internal atmosphere within the container 58 is vented through a threaded adapter 80 which leads to a connector 81 thence to pipe 82 to a ball check valve 84. The ball in the ball check valve 84 is made from a chrome alloy steel and is approximately one inch in diameter. The pipe 82 has an internal diameter of about ¾" and a mouth of about 1¼" I.D. to receive ball check valve 84. The weight of the ball is carefully controlled, depending upon the particular elevation at which the commercial apparatus will be installed, so as to provide a controllable pressure at which the pressure within the container 58 will be vented. Thus as a representative example, the ball in the ball check valve 84 weighs 0.148 lb. for an installation at sea level to give a vent pressure of about one-third pound per square inch. In all instances, the pressure is vented within one p.s.i. of atmospheric pressure. The ball check valve 84 prevents any undue moisture loss from within container 58 and in that connection a moisture trap or expansion chamber is provided at 85.

A pair of front to rear extending angle irons 86 and a pair of transverse angle irons 87, FIG. 3, provide a support for the internal container 58. A series of brackets 83 provide further rigid support between container 58 and the pair of transverse angle irons 87.

A thermostat 88 is positioned on the front panel of the apparatus and connects with a temperature probe 89 which is led into the interior of container 58 in order to sense the temperature during the cooking operation. For the convenience of the operator, a shelf 90 may be pulled from the front of the apparatus and with the aid of a brace 92, positioned as shown in phantom in FIG. 1. Basket 100 is placed on shelf 90 when it is set up in the phantom position of FIG. 1 and the chicken parts are placed in the wire basket 100. Any suitable form of shelf may be used.

The electrical circuitry for a preselected heating cycle and time control is contained within cabinet 94 and forms no part of the present invention.

Turning now to FIGURES 4, 5, 6 and 7 there are illustrated the details of the wire basket 100 which holds the chicken parts to be fried. Wire basket 100 is shown to have a wall portion 102 which slopes outwardly and upwardly at its upper wall as best seen at 104 in FIG. 5. A pair of bar members 106 and 108 are affixed to the edge of the sloping top wall 104 and extend diametrically across the top of basket 100. A series of end plate members 110 and 112 provide a rigid end support for the ends of bar members 106 and 108. Intermediate plate members 114, 116 and 118 are fixedly secured between bar members 106 and 108 and each of them carries respectively locking members 120, 122 and 124. Each of the latter locking members 120, 122 and 124 is engageable with pairs of latching members, an individual one of which is shown at 126 in FIG. 7.

Reference to FIG. 8 illustrates the general arrangement of the latching and locking members in their engaged position. Thus a torsion spring 128 normally engages the individual latching members 126 toward each other by virtue of engagement of the torsional spring with the surface 146 on latching members 126. Surface 146 provides a camming surface for the torsional springs 128. A pin 130 extends through a pair of drilled bar members 131 which are fixedly attached to the underside of plate member 54 and the pin also extends through an aperture 144 in latching members 146 and the torsional spring 128. Therefore relative vertical movement of the basket 100 results in locking members 120, 122 and 124 spreading the pairs of latching members 126 apart until the conical surface on the end of locking members 120, 122 and 124 pass a latching detent 148 on the latching members 126 at which point the torsional spring causes the latching members 126 to spring inwardly into locking relationship with locking members 120, 122 and 124. In the practice of this invention, the plate member 54 with suspended latching means 126 are driven downwardly by screw means 30 into locking engagement with locking members 120, 122 and 124. In order to remove the basket from its locked position, it is necessary only to move the basket horizontally so that the locking members 120, 122 and 124 are moved off the latching detent surface 148 whereby the basket may be removed and placed on the shelf 90 at the front of the apparatus for further disposition of the product.

Reference to FIGS. 8 and 9 shows the details of the apparatus for stopping turning of the screws 30 which are driven by jack motors 32. Thus in FIGS. 8 and 9 there is shown an actuator means 132 which is driven by the screw 30 upwardly and downwardly into contact with roller arm followers 135 of limit switch 134 in which position the gasket 56 on plate member 54 is in the position shown in FIG. 2 in hermetically sealing engagement with the wall 60 of container 58. After the cooking cycle is completed, the jack motor 32 drives the screw 30 so as to bring actuator means 132 into engagement with the roller arm follower 137 of limit switch 136 as shown in FIG. 9 in which position the basket 100 and plate member 54 are in the position illustrated in FIG. 1. The slots 138 and 140 in vertical support member 142 permit the limit switches 134, 136 to be finely adjusted to secure a desired upper and lower position for plate member 54 and associated suspended wire basket 100.

In operation, the container 58 is filled with a desired amount of oil. It has been found that 2½ pounds minimum to 3 pounds of oil is required per pound of raw chicken product. The chickens themselves are a minimum of 2¼ pound shell U.S.D.A. or the equivalent fresh (not frozen) 3 or 2½ pounds U.S.D.A. or equivalent fresh (not frozen) with giblets. A typical batch of chicken parts consists of 15 pounds of product. The apparatus is preheated to 370° F., the product is first marinated for a minimum of 25 minutes in a salt, sugar, water solution. If the marination is to be quick, i.e. for 25 minutes, a solution containing 12 ounces dry measure of salt and 2 ounces of sugar to each gallon of water is used. If the marination is to be long, such as 4 hours or longer such as overnight, the solution consists of 4 ounces dry measure of salt and one ounce of sugar to each gallon of water. After marinating the chicken parts, they are breaded in a herb seasoned flour and must be cooked immediately, that is within thirty minutes and not refrigerated after breading. The product is brought to room temperature within the 30 minutes and is then placed in the basket such as on shelf 90. Basket 100 is then manually dropped into container 58 with the bottom of basket 100 resting on the uppermost internal reinforcing member 70 of cage 66 as is shown in FIGURE 2. At this time it is important that the product be stirred so as to prevent the chicken parts from sticking together thereby resulting in white spots on the finished chicken product by failing to fry the breading in the stuck together area.

After stirring, an "on" button (not shown) on the front panel is pushed to actuate main drive motor 34 which drives jack motors 32 thereby turning screws 30.

The screws 30 will turn in synchronism to lower plate member 54 and suspended latching members 126 until such time as actuator means 132 engages the roller cam follower 135 of limit switch 134 at which time rotation ceases. When this occurs, the gasket 56 on plate member 54 is in hermetic sealing relationship with the wall 60 of container 58 and locking members 120, 122 and 124 are in locking engagement with their associated spring loaded latching members 126 as illustrated in FIGURE 2. In order to accomplish this, the locking members 120, 122 and 124 had to push the spring loaded latching members 126 outwardly in pivoting relationship until such time as the conical heads on the locking members 120, 122 and 124 have passed and engaged the latching detent 148 of the latching members 126.

The oil has been preheated to between 350° F. and 375° F., such as 370° F., at which temperature the chicken parts are cooked for about one minute to seal in the moisture. The temperature of the oil in container 58 is programmed to be cut back to between 275 and 315° F., such as 290° F. and continued for about 11 more minutes. During this time the pressure within container 58 is prevented from increasing because of the ball check valve 84 which relieves the pressure so that it never rises to more than 1 p.s.i. gauge above atmospheric. After cooking for about 11 minutes at a temperature between 275° F. and 315° F., such as 290° F., a timing device overrides limit switch 134 so as to restart the motor drive whereupon screw 30 turns so as to drive the actuator means 132 vertically upward until such time as it engages the roller arm follower 137 of limit switch 136, at which time the motor cuts off.

If it is impossible to fry the chicken within one-half hour of the marinating step, it is important that the chicken be re-marinated. This is accomplished by marinating the chicken in the same marinating solution for from 1 to 5 minutes, and preferably 1 minute.

It is important that the oil used in cooking must be filtered a minimum of each ten runs, and it is also important to prevent any water getting into the oil. It will also be observed that the heating elements 74 are spaced from the bottom of the container 58. This establishes a cold area adjacent the bottom of container 58 so that the breading may fall from the chicken parts and settle to the bottom of container 58 without burning. Therefore, a burned flavor is not imparted to the chicken parts.

The breading solution is prepared by adding and beating 1 dozen fresh eggs, either medium or Grade A large, to each gallon of whole Grade A milk (not powdered). After draining, the product is rolled in herb seasoned flour and must be cooked substantially immediately without refrigeration after the product is brought to room temperature.

It is thought that the invention and many of its attendant advantages will be understood from the foregoing description, and it will be apparent that various changes may be made in the form, construction and arrangement of parts and the method taught herein without departing from the spirit and scope of the invention, the form hereinbefore described being merely a preferred embodiment thereof.

What is claimed is:
1. A method of frying chicken comprising the steps of
 (a) marinating chicken parts for at least 25 minutes in a solution of sugar, salt and water,
 (b) breading said chicken parts,
 (c) preheating cooking oil in a cooking container to a temperature of about 350° F. to 375° F.,
 (d) placing a batch of chicken parts into said cooking oil within one-half hour of said step of marinating said chicken parts, and heating said chicken parts for about 1 minute while stirring said chicken parts after placing said chicken parts into said cooking oil for cooking in order to prevent white spots on the cooked chicken caused by said chicken parts sticking together,
 (e) hermetically sealing said chicken parts within said container and reducing the temperature of said cooking oil to a temperature of about 275° F. to 315° F. while preventing the pressure within the cooking container from exceeding one pound per square inch gauge and cooking said chicken parts for about eleven more minutes, and
 (f) removing said chicken parts from the cooking container.
2. A method of frying chicken as defined in claim 1 wherein said marinating step occurs for at least 25 minutes and the proportionate parts of said solution consist of 12 ounces dry measure of salt and 2 ounces of sugar to each gallon of water.
3. A method of frying chicken as defined in claim 1 wherein said marinating step occurs for more than four hours and the proportionate parts of said solution consist of four ounces dry measure of salt and one ounce of sugar to each gallon of water.
4. A method of frying chicken as defined in claim 1 wherein said batch of chicken parts is placed into said cooking oil for cooking more than one-half hour after said step of marinating said chicken parts and wherein said batch of chicken parts has been re-marinated from 1 to 5 minutes within one-half hour prior to being placed into said cooking oil for cooking.
5. A method of frying chicken comprising the steps of
 (a) marinating chicken parts for at least 25 minutes in a solution of sugar, salt and water,
 (b) breading said chicken parts,
 (c) preheating cooking oil in a cooking container to a temperature of about 350° F. to 375° F.,
 (d) placing a batch of said chicken parts into said cooking oil within one-half hour of said step of marinating said chicken parts, and heating said chicken parts for about 1 minute,
 (e) hermetically sealing said chicken parts within said container and reducing the temperature of said cooking oil to a temperature of about 275° F. to 315° F. while preventing the pressure within the cooking container from exceeding one pound per square inch gauge and cooking said chicken parts for about eleven more minutes, and
 (f) removing said chicken parts from the cooking container.

References Cited

UNITED STATES PATENTS

| | | | |
|---|---|---|---|
| 2,778,736 | 1/1957 | Wagner | 99—107 X |
| 3,194,662 | 7/1965 | Nelson | 99—107 X |
| 3,282,460 | 11/1966 | Boznango | 99—107 X |

HYMAN LORD, Primary Examiner

U.S. Cl. X.R.

99—328, 336, 407, 408